(12) United States Patent
Li

(10) Patent No.: US 8,447,030 B2
(45) Date of Patent: May 21, 2013

(54) DUAL MODE COMMUNICATION DEVICE AND METHOD FOR MANAGING VOICE COMMUNICATION

(75) Inventor: Tao-Liang Li, Shenzhen (CN)

(73) Assignees: Shenzhen Futaihong Precision Industry Co., Ltd., Shenzhen (CN); Chi Mei Communication Systems, Inc., New Taipei (TW)

( * ) Notice: Subject to any disclaimer, the term of this patent is extended or adjusted under 35 U.S.C. 154(b) by 106 days.

(21) Appl. No.: 13/198,718

(22) Filed: Aug. 5, 2011

(65) Prior Publication Data
US 2012/0250853 A1    Oct. 4, 2012

(30) Foreign Application Priority Data
Apr. 1, 2011    (CN) .......................... 2011 1 0082057

(51) Int. Cl.
*H04M 1/00* (2006.01)
*H04M 9/00* (2006.01)

(52) U.S. Cl.
CPC .. *H04M 1/00* (2013.01); *H04M 9/00* (2013.01)
USPC .......................... 379/422; 379/419; 455/550.1

(58) Field of Classification Search
USPC ................ 379/419, 422, 430; 381/26, 74, 77, 381/81, 124, 370, 384, 394; 455/552.1, 550.1, 455/575.1, 569.1
See application file for complete search history.

(56) References Cited

U.S. PATENT DOCUMENTS

| | | | |
|---|---|---|---|
| 7,072,476 B2 * | 7/2006 | White et al. | 381/74 |
| 2007/0123192 A1 * | 5/2007 | Sinai | 455/403 |
| 2007/0124526 A1 * | 5/2007 | Sinai | 710/306 |
| 2010/0130249 A1 * | 5/2010 | Tam | 455/556.1 |

* cited by examiner

*Primary Examiner* — Tuan D Nguyen
(74) *Attorney, Agent, or Firm* — Altis Law Group, Inc.

(57) ABSTRACT

A dual mode communication device comprises a first mode chip, a second mode chip, a switch, a first headphone jack, and a second headphone jack. The first headphone jack is electronically and selectively connected to the first mode chip or to the second mode chip through the switch. The second headphone jack is electronically connected to the second mode chip. The dual mode phone can simultaneously establish two voice communications with two other communication devices using the first mode chip and the second mode chip by respectively transmitting voice signals of the two voice communications through the first headphone jack and the second headphone jack.

18 Claims, 3 Drawing Sheets

DUAL MODE COMMUNICATION DEVICE AND METHOD FOR MANAGING VOICE COMMUNICATION

BACKGROUND

1. Technical Field

Embodiments of the present disclosure relate generally to communication management within communication devices, and more particularly, to a dual mode communication device and method for managing voice communications in a dual mode communication device.

2. Description of Related Art

Dual mode communication devices, such as dual mode mobiles, are widely used. The dual mode communication devices can communicate with other communication devices through two types of wireless networks, such as the global system for mobile communication (GSM) network and the code division multiple access (CDMA) network. However, the dual mode communication devices can not simultaneously process two types of voice communication required at the same time by two users using the same device.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
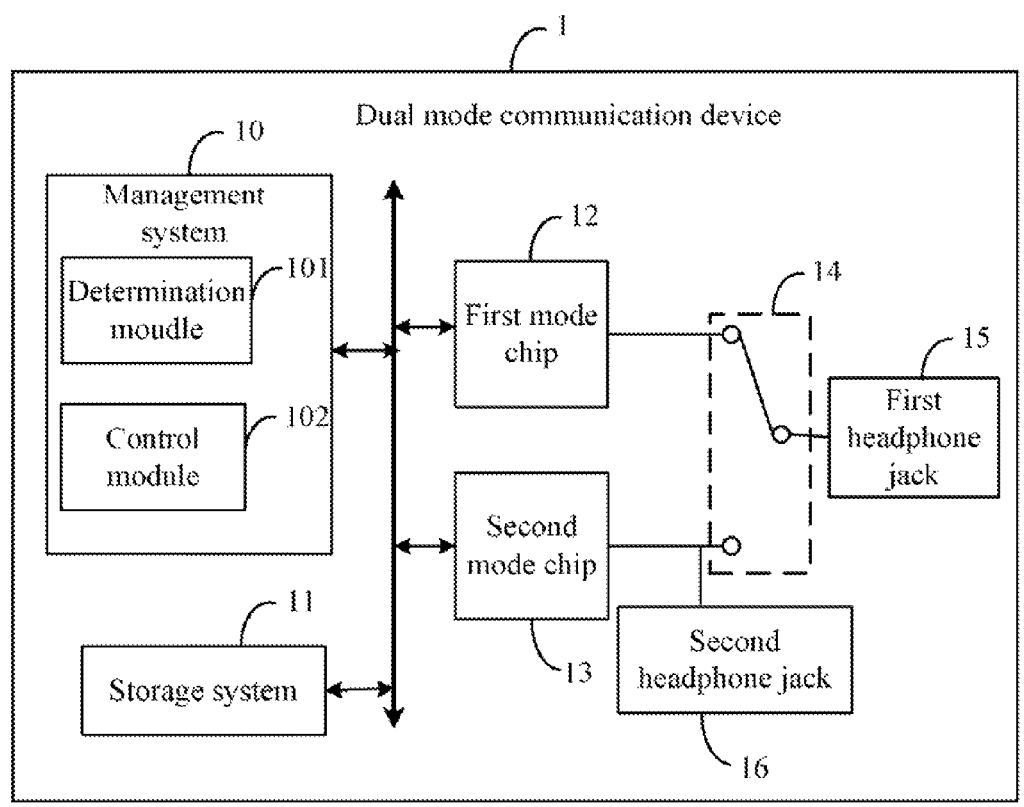
FIG. 1 is a block diagram of one embodiment of a dual mode communication device including a management system.

FIG. 1 is a block diagram of one embodiment of a dual mode communication device 1 including a management system 10. In the embodiment, the device 1 further includes a storage system 11, a first mode chip 12, a second mode chip 13, a switch 14, a first headphone jack 15, and a second headphone jack 16. In one embodiment, the first mode chip 12 may be a global system of mobile communication (GSM) baseband processor for processing voice communications, data transmissions, and other operations of the device 1 over a GSM network. The second mode chip 13 may be a code division multiple access (CDMA) baseband processor for processing voice communications, data transmissions, and other operations over a CDMA network. In another embodiment, the first mode chip 12 may be the CDMA baseband processor, and the second mode chip 13 may be the GSM baseband processor. It should be understood that FIG. 1 is only one example of the device 1, and other devices may be included with more or less components than shown in other embodiments, or have a different configuration of the various components.

The first headphone jack 15 is electronically and selectively connected to the first mode chip 12 or the second mode chip 13 through the switch 14. The second headphone jack 16 is electronically connected to the second mode chip 13. In one embodiment, both the first headphone jack 15 and the second headphone jack can connect to a headphone, so that the device 1 can output or receive voices through the headphone. The switch 14 may be an analog switch, in one example.

The management system 10 may include a plurality of software programs in form of one or more computerized instructions that are stored in the storage system 11, and executed by the first mode chip 12 or the second mode chip 13 to perform operations of the device 1. In the embodiment, the management system 10 includes a determination module 101, and a control module 102. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The determination module 101 is operable to determine whether the second mode chip 12 is in a voice communication state, when a voice communication between the device 1 and another communication device takes place use of the first mode chip 12. In one embodiment, if the second mode chip 12 is processing a voice communication between the device 1 and another communication device, the second mode chip 12 is determined to be in the voice communication state.

The control module 102 is operable to control the second mode chip 13 to transmit voice signals going through the second mode chip 13 through the second headphone jack 16, then control the first headphone jack 15 to connect to the first mode chip 12 through the switch 14, if the second mode chip 13 is in the voice communication state. In response to a determination by the determination module 101 that the second mode chip is in the voice communication state, the control module is further operable to control the first mode chip 12 to transmit voice signals going through the first mode chip through the first headphone jack 15. Thus, each of two users with headphones can use one of the two headphone jacks 15 and 16 in a single device to simultaneously communicate with other two communication devices. The voice signals may be, for example, voices received from other communication devices, or voices input by either one of the users of the device 1 using the headphones inserted into the first headphone jack 15 and the second headphone jack. The voices received from other communication devices may be output to the first headphone jack 15 or to the second headphone jack 16 as appropriate. The input voice signals are transmitted to the communication device that communicates with the device 1 through the GSM network or the CDMA network by the device 1.

In the embodiment, if the second mode chip 13 is not in the voice communication state, the control module 102 is further operable to directly control the first headphone jack 15 to connect to the first mode chip 12, and to control the first mode chip 12 to transmit the voice signals going through the first mode chip 12 through the first headphone jack 15. It should be understood that, if no headphone is inserted into the first headphone jack 15, the first mode chip 12 may output the received voice signals to a loudspeaker of the device 1, and the user may transmit his own speech using a microphone of the device 1.

The determination module 101 is further operable to determine whether the first mode chip 12 is in the voice communication state, when a voice communication between the device 1 and another communication device takes place use of the second mode chip 13. The control module 102 is further operable to control the first mode chip 12 to transmit voice signals going through the first mode chip 12 through the first headphone jack 15 by connecting the first headphone jack 15 to the first mode chip 12, and to control the second mode chip 13 to transmit voice signals going through the second mode chip 13 through the second headphone jack 16, if the first mode chip 12 is in the voice communication state.

When the first mode chip 12 is not in the voice communication state, the determination module 101 is further operable to determine a presence of a headphone in the second headphone jack 16. If no headphone is present in the second headphone jack 16, the control module 102 is further operable to control the first headphone jack 15 to connect to the second mode chip 13, and control the second mode chip 13 to transmit the voice signals going through the second mode chip 13 through the first headphone jack 15. If a head phone is present in the second headphone jack 16, the control module 102 is further operable to control the second mode chip 13 to transmit the voice signals going through the second mode chip 13 through the second headphone jack 16. Thus, when the voice communication takes place through the second mode chip 13, at a time when the first mode chip 12 is not in the voice communication state, the user can insert a headphone into either the first headphone jack 15 or the second headphone jack 16 to listen and speak with another communication device.

Figure 2:
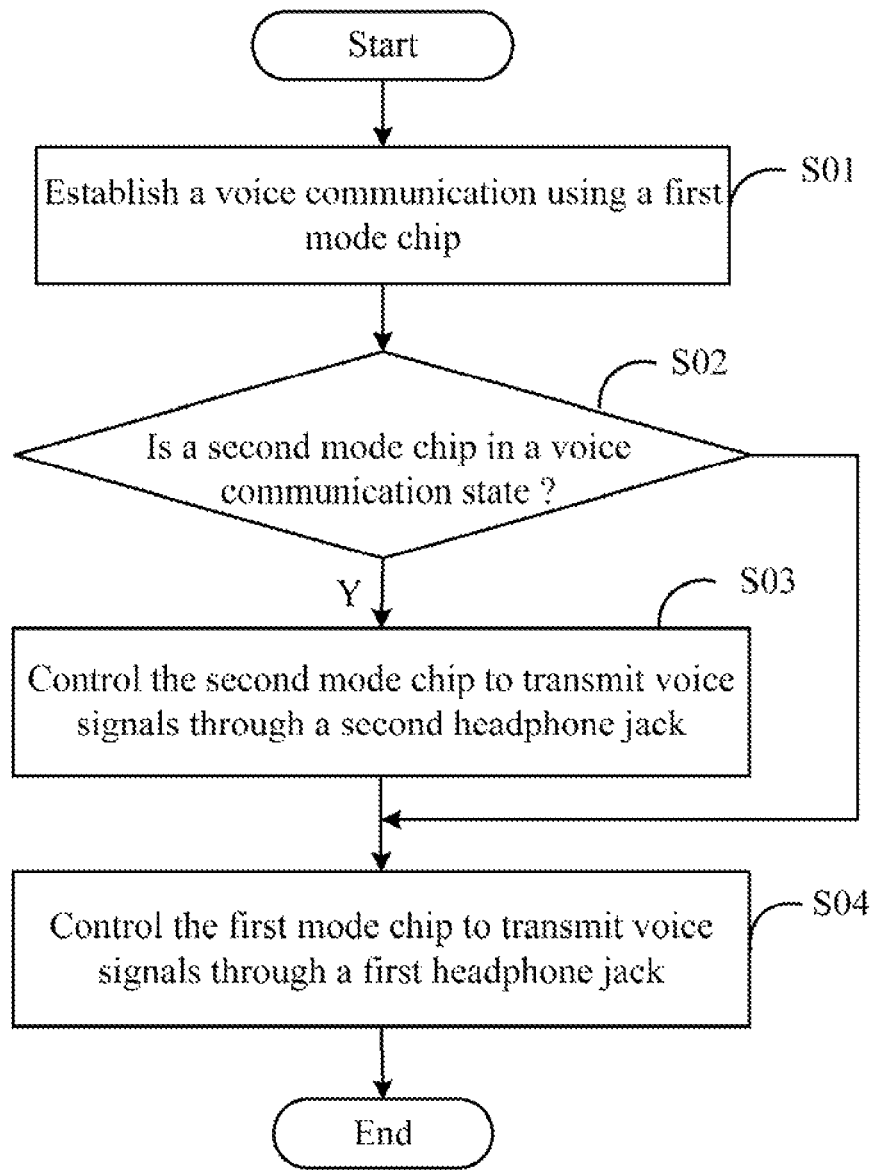
FIG. 2 is a flowchart of one embodiment of a method for managing voice communication being carried out by a first mode chip of the dual mode communication device of FIG. 1.

FIG. 2 is a flowchart of one embodiment of a method for managing voice communication being carried out by a first mode chip of the dual mode communication device of FIG. 1. Depending on the embodiment, additional blocks may be added, others removed, and the ordering of the blocks may be changed.

In block S01, the first mode chip 12 establishes a voice communication between the device 1 and another communication device.

In block S02, the determination module 101 determines whether the second mode chip 12 is in a voice communication state. If the second mode chip 12 is in the voice communication state, block S03 is implemented. Otherwise, block S04 is implemented. In one embodiment, if the second mode chip 12 is processing a voice communication between the device 1 and another communication device, the second mode chip 12 is regarded as being in the voice communication state.

In block S03, the control module 102 controls the second mode chip 13 to transmit voice signals going the second mode chip 13 through the second headphone jack 16.

In block S04, the control module 102 controls the first headphone jack 15 to connect to the first mode chip 12 through the switch 14, and controls the first mode chip 12 to transmit voice signals going through the first mode chip 12 through the first headphone jack 15.

Figure 3:
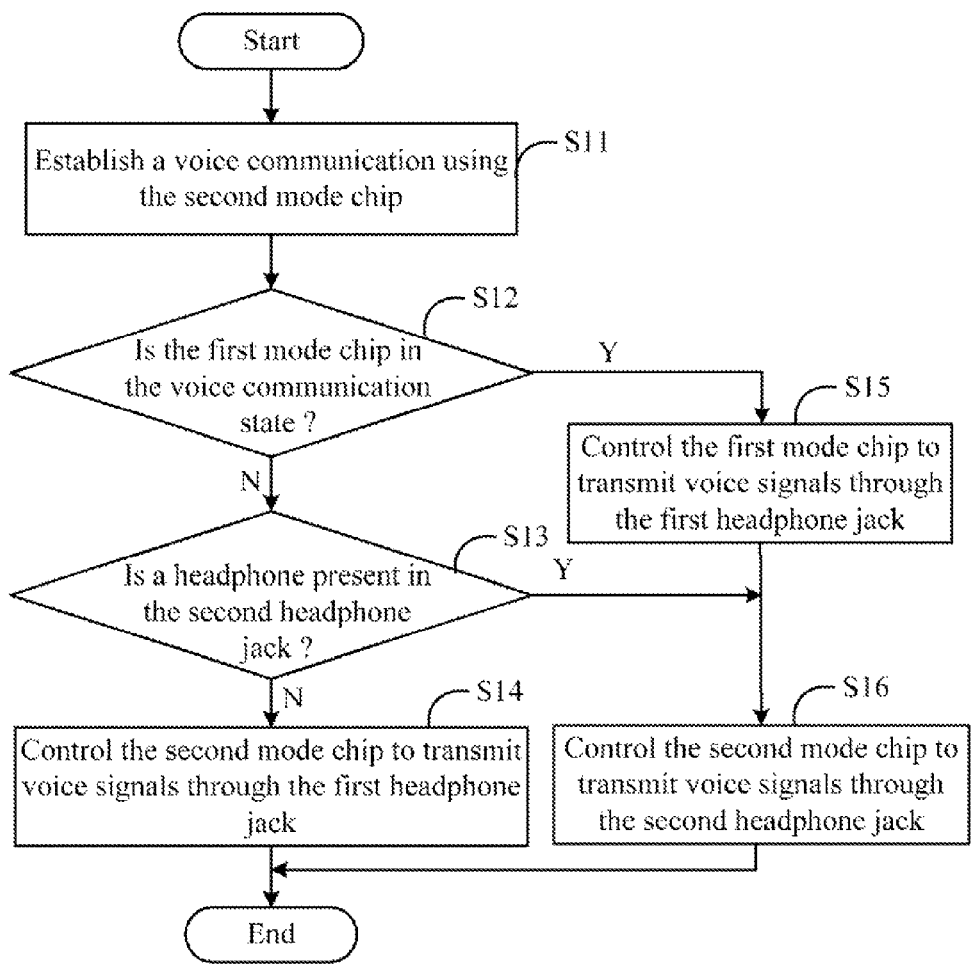
FIG. 3 is a flowchart of the method for managing voice communication being carried out by a second mode chip of the dual mode communication device of FIG. 1.

FIG. 3 is a flowchart of the method for managing voice communication being carried out by a second mode chip of the dual mode communication device of FIG. 1.

In block S11, the second mode chip 13 establishes a voice communication between the device 1 and another communication device.

In block S12, the determination module 101 determines whether the first mode chip 12 is in the voice communication state. If the first mode chip 12 is in the voice communication state, block S15 is implemented. Otherwise, if the first mode chip 12 is not in the voice communication state, block S13 is implemented.

In block S13, the determination module 101 determines whether a headphone is present in the second headphone jack 16. If no headphone has been inserted into the second headphone jack 16, block S14 is implemented. Otherwise, if a headphone has been inserted into the second headphone jack 16, block S16 is implemented.

In block S14, the control module 102 controls the first headphone jack 15 to connect to the second mode chip 13, and controls the second mode chip 13 to transmit voice signals going through the second mode chip 13 through the first headphone jack 15, and ends the procedure.

In block S15, the control module 102 controls the first mode chip 12 to transmit voice signals going through the first mode chip 12 through the first headphone jack 15 by connecting the first headphone jack 15 to the first mode chip 12 through the switch 14.

In block S16, the control module 102 controls the second mode chip 13 to transmit the voice signals going through the second mode chip 13 through the second headphone jack 16.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A method for managing voice communications of a dual mode communication device, the dual mode communication device comprising a switch, a first headphone jack, and a second headphone jack, the method comprising:
   determining whether a second mode chip of the dual mode communication device is in a voice communication state, when a voice communication between the dual mode communication device and another communication device takes place use of a first mode chip of the dual mode communication device;
   controlling the second mode chip to transmit voice signals that are processed by the second mode chip through the second headphone jack, and then controlling the first mode chip to transmit voice signals that are processed by the first mode chip through the first headphone jack by connecting the first headphone jack to the first mode chip through the switch, if the second mode chip is in the voice communication state; or
   controlling the first mode chip to transmit voice signals that are processed by the first mode chip through the first headphone jack by connecting the first headphone jack to the first mode chip through the switch, if the second mode chip is not in the voice communication state.

2. The method according to claim 1, further comprising:
   determining whether the first mode chip is in the voice communication state, when a voice communication between the dual mode communication device and another communication device takes place use of the second mode chip; and
   controlling the first mode chip to transmit voice signals that are processed by the first mode chip through the first headphone jack by connecting the first headphone jack to the first mode chip through the switch, and controlling the second mode chip to transmit voice signals that are processed by the second mode chip through the second headphone jack, if the first mode chip is in the voice communication state.

3. The method according to claim 2, further comprising:
   determining whether a headphone is present in the second headphone jack, if the first mode chip is not in the voice communication state; and
   controlling the first headphone jack to connect to the second mode chip through the switch, and controlling the second mode chip to transmit voice signals that are processed by the second mode chip through the first headphone jack, if no headphone is present in the second headphone jack; or controlling the second mode chip to transmit the voice signals going through the second mode chip through the second headphone jack if a headphone is present in the second headphone jack.

4. The method according to claim 1, wherein the second headphone jack is electronically connected to the second mode chip.

5. The method according to claim 1, wherein the first headphone jack is electronically and selectively connected to the first mode chip or the second mode chip through the switch.

6. The method according to claim 1, wherein the voice signals comprise voice signals received from other communication device that communicates with the dual mode communication device, and voices input by a user of the dual mode communication device through the first headphone jack or the second headphone jack.

7. A dual mode communication device, comprising:
a switch;
a first mode chip;
a second mode chip;
a storage system; and
one or more programs stored in the storage system and being executable by the first mode chip or the second mode chip, the one or more programs comprising:
a determination module operable to determine whether the second mode chip is in a voice communication state, when a voice communication between the dual mode communication device and another communication device takes place use of the first mode chip; and
a control module operable to control the second mode chip to transmit voice signals that are processed by the second mode chip through the second headphone jack, and then control the first mode chip to transmit voice signals that are processed by the first mode chip through the first headphone jack by connecting the first headphone jack to the first mode chip through the switch, if the second mode chip is in the voice communication state, or directly control the first mode chip to transmit voice signals that are processed by the first mode chip through the first headphone jack by connecting the first headphone jack to the first mode chip through the switch, if the second mode chip is not in the voice communication state.

8. The dual mode communication device according to claim 7, wherein the determination module is further operable to determine whether the first mode chip is in the voice communication state, when a voice communication between the dual mode communication device and another communication device takes place use of the second mode chip; and wherein the control module is further operable to control the first mode chip to transmit voice signals that are processed by the first mode chip through the first headphone jack by connecting the first headphone jack to the first mode chip through the switch, and control the second mode chip to transmit the voice signals that are processed by the second mode chip through the second headphone jack, if the first mode chip is in the voice communication state.

9. The dual mode communication device according to claim 8, wherein the determination module is further operable to determine whether a headphone is present in the second headphone jack, if the first mode chip is not in the voice communication state; and wherein the control module is further operable to control the first headphone jack to connect to the second mode chip, and controlling the second mode chip to transmit voice signals that are processed by the second mode chip through the first headphone jack, if no headphone is present in the second headphone jack, or control the second mode chip to transmit the voice signals that are processed by the second mode chip through the second headphone jack, if a headphone is present in the second headphone jack.

10. The dual mode communication device according to claim 7, wherein the second headphone jack is electronically connected to the second mode chip.

11. The dual mode communication device according to claim 7, wherein the first headphone jack is electronically and selectively connected to the first mode chip or the second mode chip through the switch.

12. The dual mode communication device according to claim 7, wherein the voice signals comprise voices received from other communication device that communicates with the dual mode communication device, and voices input by a user of the dual mode communication device through the first headphone jack or the second headphone jack.

13. A non-transitory storage medium storing a set of instructions, the set of instructions capable of being executed by a first mode chip or a second mode chip of a dual mode communication device, to perform a method for managing voice communications of the dual mode communication device, the dual mode communication device comprising a switch, a first headphone jack, and a second headphone jack, the method comprising:

determining whether a second mode chip of the dual mode communication device is in a voice communication state, when a voice communication between the dual mode communication device and another communication device takes place use of a first mode chip of the dual mode communication device;

controlling the second mode chip to transmit voice signals that are processed by the second mode chip through the second headphone jack, and then controlling the first mode chip to transmit voice signals that are processed by the first mode chip through the first headphone jack by connecting the first headphone jack to the first mode chip through the switch, if the second mode chip is in the voice communication state; or controlling the first mode chip to transmit voice signals that are processed by the first mode chip through the first headphone jack by connecting the first headphone jack to the first mode chip through the switch, if the second mode chip is not in the voice communication state.

14. The non-transitory storage medium according to claim 13, wherein the method further comprises:

determining whether the first mode chip is in the voice communication state, when a voice communication between the dual mode communication device and another communication device takes place use of the second mode chip; and controlling the first mode chip to transmit voice signals that are processed by the first mode chip through the first headphone jack by connecting the first headphone jack to the first mode chip through the switch, and controlling the second mode chip to transmit voice signals that are processed by the second mode chip through the second headphone jack, if the first mode chip is in the voice communication state.

15. The non-transitory storage medium according to claim 14, wherein the method further comprises:

determining whether a headphone is present in the second headphone jack, if the first mode chip is not in the voice communication state; and controlling the first headphone jack to connect to the second mode chip through the switch, and controlling the second mode chip to transmit voice signals that are processed by the second mode chip through the first headphone jack, if no headphone is present in the second headphone jack; or controlling the second mode chip to transmit the voice signals going through the second mode chip through the second headphone jack if a headphone is present in the second headphone jack.

16. The non-transitory storage medium according to claim 13, wherein the second headphone jack is electronically connected to the second mode chip.

17. The non-transitory storage medium according to claim 13, wherein the first headphone jack is electronically and selectively connected to the first mode chip or the second mode chip through the switch.

18. The non-transitory storage medium according to claim 13, wherein the voice signals comprise voices received from other communication device that communicates with the dual mode communication device, and voices input by a user of the dual mode communication device through the first headphone jack or the second headphone jack.

* * * * *